(12) United States Patent
Papasakellariou et al.

(10) Patent No.: US 9,106,351 B2
(45) Date of Patent: *Aug. 11, 2015

(54) METHOD AND APPARATUS FOR CODING OF HARQ-ACK TRANSMISSION IN TDD SYSTEMS WITH DOWNLINK CARRIER AGGREGATION

(71) Applicant: Samsung Electronics Co., Ltd., Gyeonggi-do (KR)

(72) Inventors: Aris Papasakellariou, Houston, TX (US); Joon-Young Cho, Gyeonggi-do (KR)

(73) Assignee: Samsung Electronics Co., Ltd. (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/070,018

(22) Filed: Nov. 1, 2013

(65) Prior Publication Data

US 2014/0056187 A1 Feb. 27, 2014

Related U.S. Application Data

(63) Continuation of application No. 13/288,597, filed on Nov. 3, 2011, now Pat. No. 8,594,022.

(60) Provisional application No. 61/409,662, filed on Nov. 3, 2010, provisional application No. 61/410,162, filed on Nov. 4, 2010, provisional application No. 61/410,642, filed on Nov. 5, 2010, provisional application No. 61/411,209, filed on Nov. 8, 2011, provisional application No. 61/512,614, filed on Jul. 28, 2011.

(51) Int. Cl.
*H04Q 7/00* (2006.01)
*H04J 3/00* (2006.01)
*H04L 1/16* (2006.01)
*H04L 1/18* (2006.01)

(52) U.S. Cl.
CPC ............. *H04J 3/00* (2013.01); *H04L 1/1614* (2013.01); *H04L 1/1861* (2013.01)

(58) Field of Classification Search
None
See application file for complete search history.

(56) References Cited

U.S. PATENT DOCUMENTS 8,537,788 B2* 9/2013 Lee et al. ............... 370/335
8,594,022 B2* 11/2013 Papasakellariou et al. ... 370/328

(Continued)

FOREIGN PATENT DOCUMENTS

WO WO2010062061 6/2010
WO WO2010124244 10/2010

OTHER PUBLICATIONS

Ericsson, "Evaluation of PUCCH Proposals for Carrier Aggregation", 3GPP TSG-RAN WG1 #61bis, R1-103507, Jul. 2, 2010.

*Primary Examiner* — Duc C Ho
(74) *Attorney, Agent, or Firm* — The Farrell Law Firm, P.C.

(57) ABSTRACT

Methods and apparatus are provided for a User Equipment (UE) configured with multiple cells in a DownLink (DL) of a Time Division Duplex (TDD) communication system to determine the coding method for acknowledgement information bits as a function of their number, to apply bundling to the acknowledgement information bits when their number exceeds a first predetermined value, and to partition the acknowledgement information bits, possibly together with other control information bits, into two separate codewords when their total number exceeds a second predetermined value.

14 Claims, 14 Drawing Sheets

(56) References Cited

U.S. PATENT DOCUMENTS

| | | | |
|---|---|---|---|
| 8,634,333 B2* | 1/2014 | Sarkar | 370/278 |
| 8,750,214 B2* | 6/2014 | Mauritz et al. | 370/328 |
| 2009/0245212 A1 | 10/2009 | Sambhwani et al. | |
| 2010/0195624 A1 | 8/2010 | Zhang et al. | |
| 2010/0202348 A1 | 8/2010 | Sambhwani | |
| 2011/0154170 A1 | 6/2011 | Challa et al. | |
| 2011/0211489 A1 | 9/2011 | Chung et al. | |
| 2012/0008585 A1 | 1/2012 | Kwon et al. | |
| 2012/0082145 A1 | 4/2012 | Chen et al. | |
| 2012/0099491 A1 | 4/2012 | Lee et al. | |

* cited by examiner

| Cell 0 ~1210 | DL SUBFRAME 0 | DL SUBFRAME 1 | DL SUBFRAME 2 | DL SUBFRAME 3 | $b_0,b_1,b_2,b_3,b_4,b_5,b_6,b_7$ ~1215 | SPATIAL-DOMAIN BUNDLING → $d_0,d_1,d_2,d_3$ ~1218 |
| Cell 1 ~1220 | DL SUBFRAME 0 | DL SUBFRAME 1 | DL SUBFRAME 2 | DL SUBFRAME 3 | $b_8,b_9,b_{10},b_{11}$ ~1225 | TIME-DOMAIN BUNDLING → $d_{16},d_{17}$ ~1228 |
| Cell 2 ~1230 | DL SUBFRAME 0 | DL SUBFRAME 1 | DL SUBFRAME 2 | DL SUBFRAME 3 | $b_{12},b_{13},b_{14},b_{15},b_{16},b_{17},b_{18},b_{19}$ ~1235 | SPATIAL-DOMAIN BUNDLING → $d_4,d_5,d_6,d_7$ ~1238 |
| Cell 3 ~1240 | DL SUBFRAME 0 | DL SUBFRAME 1 | DL SUBFRAME 2 | DL SUBFRAME 3 | $b_{20},b_{21},b_{22},b_{23},b_{24},b_{25},b_{26},b_{27}$ ~1245 | SPATIAL-DOMAIN BUNDLING → $d_8,d_9,d_{10},d_{11}$ ~1248 |
| Cell 4 ~1250 | DL SUBFRAME 0 | DL SUBFRAME 1 | DL SUBFRAME 2 | DL SUBFRAME 3 | $b_{28},b_{29},b_{30},b_{31},b_{32},b_{33},b_{34},b_{35}$ ~1255 | SPATIAL-DOMAIN BUNDLING → $d_{12},d_{13},d_{14},d_{15}$ ~1258 |
| Cell 5 ~1260 | DL SUBFRAME 0 | DL SUBFRAME 1 | DL SUBFRAME 2 | DL SUBFRAME 3 | $b_{36},b_{37},b_{38},b_{39}$ ~1265 | TIME-DOMAIN BUNDLING → $d_{18},d_{19}$ ~1268 |

METHOD AND APPARATUS FOR CODING OF HARQ-ACK TRANSMISSION IN TDD SYSTEMS WITH DOWNLINK CARRIER AGGREGATION

PRIORITY

This application is a Continuation application of U.S. patent application Ser. No. 13/288,597, filed on Nov. 3, 2011, which claims priority under 35 U.S.C. §119(e) to U.S. Provisional Application No. 61/409,662 which was filed in the United States Patent and Trademark Office on Nov. 3, 2010, U.S. Provisional Application No. 61/410,162 which was filed in the United States Patent and Trademark Office on Nov. 4, 2010, U.S. Provisional Application No. 61/410,642 which was filed in the United States Patent and Trademark Office on Nov. 5, 2010, U.S. Provisional Application No. 61/411,209 which was filed in the United States Patent and Trademark Office on Nov. 8, 2010, and U.S. Provisional Application No. 61/512,614 which was filed in the United States Patent and Trademark Office on Jul. 28, 2011, the disclosures of which are incorporated herein by reference.

BACKGROUND OF THE INVENTION

1. Field of the Invention

The present invention generally relates to wireless communication systems and, more particularly, to the transmission of acknowledgement information in an uplink of a communication system.

2. Description of the Art

A communication system includes a DownLink (DL) that conveys transmission signals from a Base Station (BS), or NodeB, to User Equipments (UEs), and includes an UpLink (UL) that conveys transmission signals from UEs to the NodeB. A UE, which is also commonly referred to as a terminal or a mobile station, may be fixed or mobile and may be, for example, a wireless device, a cellular phone, or a personal computer device. A NodeB is generally a fixed station and may also be referred to as an access point or some other equivalent terminology.

The UL conveys transmissions of data signals carrying information content, transmissions of control signals providing control information associated with the transmission of data signals in the DL, and transmissions of Reference Signals (RSs), which are commonly referred to as pilot signals. The DL also conveys transmissions of data signals, control signals, and RSs.

UL data signals are conveyed through a Physical Uplink Shared CHannel (PUSCH) and DL data signals are conveyed through a Physical Downlink Shared CHannel (PDSCH).

In the absence of a PUSCH transmission, a UE conveys UL Control Information (UCI) through a Physical Uplink Control CHannel (PUCCH). However, when it has a PUSCH transmission, a UE may convey UCI together with data through the PUSCH.

DL control signals may be broadcast or may be sent in a UE-specific nature. Accordingly, UE-specific control channels can be used, among other purposes, to provide UEs with Scheduling Assignments (SAs) for PDSCH reception (DL SAs) or PUSCH transmission (UL SAs). The SAs are transmitted from the NodeB to respective UEs using DL Control Information (DCI) formats through respective Physical DL Control CHannels (PDCCHs).

The NodeB may configure a UE through higher layer signaling, such as, for example, Radio Resource Control (RRC) signaling, a PDSCH and a PUSCH Transmission Mode (TM), and other parameters relating to reception of DL signals or transmission of UL signals. The PDSCH TM or PUSCH TM is respectively associated with a DL SA or a UL SA, and defines whether a respective PDSCH or PUSCH conveys one data Transport Block (TB) or two data TBs.

PDSCH or PUSCH transmissions are either scheduled to a UE by the NodeB through higher layer signaling or through physical layer signaling (through, for example, the PDCCH) using a respective DL SA or UL SA, or correspond to non-adaptive retransmissions for a given Hybrid Automatic Repeat reQuest (HARQ) process. Scheduling by higher layer signaling is referred to as Semi-Persistent Scheduling (SPS). Scheduling by PDCCH is referred to as dynamic. A PDCCH may also be used to release SPS PDSCH. If a UE misses (i.e., fails to detect) a PDCCH, it also misses the associated PDSCH or PUSCH. This event is referred to as DTX (Discontinuous Transmission).

The UCI includes ACKnowledgment (ACK) information associated with a HARQ process (HARQ-ACK). HARQ-ACK information may consist of multiple bits corresponding to positive acknowledgments (ACKs) for TBs a UE correctly received, or corresponding to Negative ACKnowledgements (NACKs) for TBs the UE incorrectly received. When a UE does not receive a TB, it may transmit DTX (tri-state HARQ-ACK information) or it may transmit a NACK that represents both the absence and the incorrect reception of a TB (in a combined NACK/DTX state).

In Time Division Duplex (TDD) systems, DL and UL transmissions occur in different Transmission Time Intervals (TTIs) which are referred to as subframes. For example, in a frame comprising of 10 subframes, some subframes may be used for DL transmissions and other subframes may be used for UL transmissions.

FIG. 1 is a diagram illustrating a frame structure for a TDD system.

Referring to FIG. 1, a 10 millisecond (ms) frame consists of two identical half-frames. Each 5 ms half-frame 110 is divided into eight slots 120 and three special fields. The three special fields include a DL ParT Symbol (DwPTS) 130, a Guard Period (GP) 140, and an UL ParT Symbol (UpPTS) 150. The length of DwPTS+GP+UpPTS is equal to one subframe (1 ms) 160. The DwPTS may be used for the transmission of synchronization signals from the NodeB, while the UpPTS may be used for the transmission random access signals from UEs. The GP facilitates the transition between DL and UL transmissions by absorbing transient interference.

The number of DL and UL subframes per frame can be different, and multiple DL subframes may be associated with a single UL subframe. In associating multiple DL subframes with a single UL subframe, a number $O_{HARQ-ACK}$ of HARQ-ACK information bits generated in response to PDSCH receptions (data TBs) in multiple DL subframes needs to be transmitted in a single UL subframe. This number of DL subframes $N_{bundle}$ is referred to as bundling window.

A first method in which a UE conveys HARQ-ACK information in a single UL subframe, in response to PDSCH receptions in multiple DL subframes, involves HARQ-ACK bundling. In HARQ-ACK bundling the UE transmits an ACK only if it correctly receives all data TBs and transmits a NACK in all other cases. Therefore, HARQ-ACK bundling results in unnecessary retransmissions and reduced DL throughput, since the NACK is transmitted even when a UE incorrectly receives only one data TB and correctly receives all other data TBs.

Another method in which a UE conveys up to 4 bits of HARQ-ACK information in a single UL subframe, in response to receptions of data TBs in multiple DL subframes, involves HARQ-ACK multiplexing, which is based on PUCCH resource selection.

An additional method in which a UE conveys multiple HARQ-ACK information bits in a single UL subframe, in response to receptions of multiple data TBs in multiple DL subframes, involves joint coding of the HARQ-ACK information bits using, for example, a block code such as a Reed-Mueller (RM) code.

If a PDSCH conveys one TB, the respective HARQ-ACK information consists of one bit which is encoded as a binary '1' (ACK value) if the TB is correctly received, and is encoded as a binary '0' (NACK value) if the TB is incorrectly received. If a PDSCH conveys two TBs, in accordance with the Single-User Multiple Input Multiple Output (SU-MIMO) transmission method with a rank higher than one, the HARQ-ACK information consists of two bits $[o_0^{ACK} o_1^{ACK}]$, with $o_0^{ACK}$ for the first TB and $o_1^{ACK}$ for the second TB. However, if a UE applies bundling in the spatial-domain for the 2 HARQ-ACK bits associated with the reception of the 2 TBs when a SU-MIMO PDSCH has a rank larger than one, the UE feedback consists of only one HARQ-ACK bit that has the binary value 0 (NACK value) when at least one TB is incorrectly received, or the binary value 1 (ACK value) when both TBs are correctly received. As the PDSCH TM determines a number of conveyed TBs (one or two), it also determines a respective number of HARQ-ACK bits (if spatial-domain bundling is not applied).

FIG. 2 is a diagram illustrating a PUCCH structure in one subframe slot for transmitting multiple HARQ-ACK information bits using a Discrete Fourier Transform Spread Orthogonal Frequency Division Multiplexing (DFT-S-OFDM) transmission method.

Referring to FIG. 2, after encoding and modulation, using for example, a RM block code and Quadrature Phase Shift Keying (QPSK), respectively, a set of same HARQ-ACK bits 210 is multiplied at multiplier 220 with elements of an Orthogonal Covering Code (OCC) 230, and is subsequently DFT precoded at DFT precoder 240. For example, for 5 symbols per slot carrying HARQ-ACK bits, the OCC has length of 5 {OCC(0), OCC(1), OCC(2), OCC(3), OCC(4)}, and can be $\{1, 1, 1, 1, 1\}$, $\{1, \exp(j2\pi/5), \exp(j4\pi/5), \exp(j6\pi/5), \exp(j8\pi/5)\}$, $\{1, \exp(j4\pi/5), \exp(j8\pi/5), \exp(j2\pi/5), \exp(j6\pi/5)\}$, $\{1, \exp(j6\pi/5), \exp(j2\pi/5), \exp(j8\pi/5), \exp(j4\pi/5)\}$, or $\{1, \exp(j8\pi/5), \exp(j6\pi/5), \exp(j4\pi/5), \exp(j2\pi/5)\}$. The output of the DFT precoder 240 is passed through an Inverse Fast Fourier Transform (IFFT) unit 250 and it is then mapped to a DFT-S-OFDM symbol 260. Since the previous operations are linear, their relative order may be inter-changed. Because a PUCCH transmission is assumed to be in one PRB, which consists of $N_{sc}^{RB}=12$ REs, there are 24 encoded HARQ-ACK bits transmitted in each slot (12 HARQ-ACK QPSK symbols) and a (32, $O_{HARQ-ACK}$) RM code is punctured into a (24, $O_{HARQ-ACK}$) RM code. The same or different HARQ-ACK bits may be transmitted in the second slot of a subframe. In addition to HARQ-ACK signals, RS are transmitted in each slot to enable coherent demodulation of HARQ-ACK signals. Each RS is constructed from a length-12 Zadoff-Chu (ZC) sequence 270, which is passed through an IFFT unit 280 and mapped to another DFT-S-OFDM symbol 290.

The PUCCH structure in FIG. 2 can support reliable reception for only a limited number of HARQ-ACK information bits, which is also referred to as a HARQ-ACK payload, without incurring a large coding rate as it can only support 24 encoded HARQ-ACK bits. The use of a dual RM code can allow for support of larger HARQ-ACK payloads. For example, a single RM code can be used for HARQ-ACK payloads up to 10 bits, and a dual RM code can be used for HARQ-ACK payloads between 11 and 20 bits. With a dual RM code, the mapping to successive elements of the DFT can alternate between elements from the output of a first RM code and elements from the output of a second RM code in a sequential manner. For HARQ-ACK payloads of more than 20 bits, convolutional coding can be used.

FIG. 3 is a diagram illustrating a transmitter block diagram for transmitting HARQ-ACK information encoded using a single RM code.

Referring to FIG. 3, HARQ-ACK information bits 305 are encoded and modulated by an encoder and modulator 310, and then multiplied with an element of an OCC 325 for the respective DFT-S-OFDM symbol at multiplier 320. The output of the multiplier 320 is then DFT precoded by DFT precoder 330. After DFT precoding, sub-carrier mapping is performed by a sub-carrier mapper 340, which is under control of a controller 350. Thereafter, the IFFT is performed by an IFFT unit 360, a CP is added by at CP inserter 370, and the signal is filtered for time windowing by filter 380, thereby generating a transmitted signal 390. Additional transmitter circuitry, such as, for example, a digital-to-analog converter, analog filters, amplifiers, and transmitter antennas may also be included in the transmitter block diagram of FIG. 3.

FIG. 4 is a diagram illustrating a receiver block diagram for receiving HARQ-ACK information encoded using a single RM code.

Referring to FIG. 4, after receiving a Radio-Frequency (RF) analog signal and converting it to a digital signal 410, the digital signal 410 is filtered for time windowing at a filter 420, and a CP is removed at a CP remover 430. Subsequently, the NodeB receiver applies an FFT at an FFT unit 440, performs sub-carrier demapping at a sub-carrier demapper 450, which is under the control of a controller 455, and applies an Inverse DFT (IDFT) at an IDFT unit 460. The output of the IDFT unit 460 is then multiplied with an OCC element 475 for the respective DFT-S-OFDM symbol a multiplier 470. An adder 480 sums the outputs for the DFT-S-OFDM symbols conveying HARQ-ACK signals over each slot, and a demodulator and decoder 490 demodulates and decodes the summed HARQ-ACK signals over both subframe slots to obtain HARQ-ACK information bits 495. Well known receiver functionalities such as, for example, channel estimation, demodulation, and decoding may also be included in the receiver block diagram of FIG. 4.

FIG. 5 is a diagram illustrating a transmitter block diagram for transmitting HARQ-ACK information encoded using a dual RM code.

Referring to FIG. 5, the payload of $O_{HARQ-ACK}$ HARQ-ACK bits 505 is first segmented into two parts of $O_{HARQ-ACK}^1 = \lceil O_{ARQ-ACK}/2 \rceil$ bits and $O_{HARQ-ACK}^2 = \lfloor O_{HARQ-ACK}/2 \rfloor$ bits at segmentation block 510. The segmented parts are subsequently individually encoded with a (32, $O_{HARQ-ACK}^1$) RM code and a (32, $O_{HARQ-ACK}^2$), respectively, and each of the 32 coded bits are then punctured to 24 coded bits which are then QPSK modulated to obtain 12 QPSK coded symbols, at coding and modulation blocks 520 and 525, respectively. The first 6 for each of the 12 QPSK coded symbols are combined, for example, by interlacing, at a block 530 and are then multiplied with an element of the OCC 545 for the respective DFT-S-OFDM symbol at a multiplier 540 for transmission in a first slot of a subframe. The same processing applies to the last 6 of the 12 QPSK coded symbols, which are transmitted in a second slot of the subframe. After DFT precoding at a DFT precoder 550, the REs of the assigned PUCCH PRB are selected at a sub-carrier mapper 565, which is under the control of a controller 560. The IFFT is performed at an IFFT block 570 and finally the CP and filtering are applied to a transmitted signal 580. Additional transmitter circuitry, such as, for example, a digital-to-analog converter, analog filters, amplifiers, and transmitter antennas may be included in the transmitter block diagram of FIG. 5.

FIG. 6 is a diagram illustrating a receiver block diagram for receiving HARQ-ACK information encoded using a dual RM code.

After an antenna receives the RF analog signal and after further processing units (such as filters, amplifiers, frequency down-converters, and analog-to-digital converters), a digital signal 610 is filtered and the CP is removed. Subsequently, the NodeB receiver applies an FFT at an FFT block 620, selects REs used by the UE transmitter at a sub-carrier demapper 630, which is under the control of a controller 635. The NodeB receiver applies an IDFT at an IDFT block 640, multiplies with an OCC element 655 for the respective DFT-S-OFDM symbol at a multiplier 650, sums the outputs for the DFT-S-OFDM symbols over each slot at a summing block 660, collects the QPSK symbols from both subframe slots at a collection block 670, splits (de-interlaces) the 24 QPSK symbols in the original pairs of 12 QPSK symbols in a split block 675, and demodulates and decodes each of the two pairs of 12 QPSK symbols at demodulation and decoding blocks 680 and 685, respectively, to obtain transmitted HARQ-ACK bits 690. Well known receiver functionalities, such as, for example, channel estimation, demodulation, and decoding, may also be included in the receiver block diagram of FIG. 6.

Using the maximum HARQ-ACK payload in a PUCCH does not create additional resource overhead. A UE may transmit a NACK or a DTX (in case of tri-state HARQ-ACK information) for the TBs it did not receive. However, the NodeB already knows the DL cells with no DL SA or PDSCH transmission to the UE, and can use the knowledge that the UE transmits a NACK for each of those DL cells (a-priori information) to improve the HARQ-ACK reception reliability. This is possible because a linear block code and QPSK are assumed to be used for the encoding and modulation of the HARQ-ACK bits, respectively, and the NodeB can consider, as candidate HARQ-ACK codewords, only those having NACK (binary '0') at the predetermined locations corresponding to cells without DL SA transmissions to the UE. Due to the implementation of the decoding process, the use of the a-priori information would be impractical or impossible if a convolutional code or a turbo code was used for encoding the HARQ-ACK information bits. Therefore, the coding rate for the transmission of HARQ-ACK information in a PUCCH depends on the number of HARQ-ACK information bits the NodeB does not know in advance.

For HARQ-ACK transmission in a PUSCH, a UE determines a respective number of coded symbols Q' as shown in Equation (1) below.

$$Q' = \min\left(\left\lceil \frac{O_{HARQ-ACK} \cdot \beta_{offset}^{PUSCH}}{Q_m \cdot R} \right\rceil, 4 \cdot M_{sc}^{PUSCH}\right) \quad (1)$$

In Equation (1), $\beta_{offset}^{PUSCH}$ is informed to the UE through higher layer signaling, $Q_m$ is the number of data modulation bits ($Q_m$=2, 4, 6 for QPSK, QAM16, QAM64, respectively), R is the data code rate of the initial PUSCH transmission for the same TB, $M_{sc}^{PUSCH}$ is the PUSCH transmission BW in the current sub-frame, and ⌈ ⌉ is the "ceiling" function which rounds a number to its next integer. The code rate R is defined as $$R = \left(\sum_{r=0}^{C_{CB}-1} K_r\right) \bigg/ (Q_m \cdot M_{sc}^{PUSCH-initial} \cdot N_{symb}^{PUSCH-initial})$$

where $C_{CB}$ is the total number of code blocks and $K_r$ is the number of bits for code block number r. The maximum number of HARQ-ACK REs is limited to the REs of 4 DFT-S-OFDM symbols ($4 \cdot M_{sc}^{PUSCH}$). The value of $Q_m \cdot R$ determines the Spectral Efficiency (SE) of the data transmission in the PUSCH and, given $M_{sc}^{PUSCH}$, it can be directly derived from the Modulation and Coding Scheme (MCS) used for the data transmission.

In TDD systems, as a UE needs to send HARQ-ACK information corresponding to potential TB receptions over multiple DL subframes in a bundling window, a DL Assignment Index (DAI) Information Element (IE), $V_{DAI}^{DL}$, is included in the DL SAs to inform the UE of the number of DL SAs transmitted to it by the NodeB. Since the NodeB cannot predict whether there will be a DL SA for a UE in future DL subframes, the $V_{DAI}^{DL}$, is a relative counter which is incremented in each DL SA transmitted to the UE and starts from the beginning after the last DL subframe in the bundling window. If the UE fails to detect the last DL SA, it cannot become aware of this event while if the UE fails to detect a DL SA other than the last one, it can become aware of this event if it receives another DL SA in a subsequent DL subframe of the same bundling window.

FIG. 7 is a diagram illustrating a setting for a DL DAI IE over 4 DL subframes of a bundling window.

Referring to FIG. 7, in a DL subframe 0 710, the NodeB transmits a DL SA to a UE and sets the DL DAI IE value to $V_{DAI}^{DL}$=0. In a DL subframe 1 720, the NodeB transmits a DL SA to the UE and sets the DL DAI IE value to $V_{DAI}^{DL}$=1. In a DL subframe 2 730, the NodeB does not transmit a DL SA to the UE and does not increment the DL DAI IE value. In a DL subframe 3 740, the NodeB transmits a DL SA to the UE and sets the DL DAI IE value to $V_{DAI}^{DL}$=2.

If a UE has data transmission in a UL subframe where it is expected to also transmit HARQ-ACK information, then both data and HARQ-ACK may be transmitted in a PUSCH. In order to avoid error cases where the UE has missed the last DL SA and ensure the same understanding between the NodeB and the UE of the number of HARQ-ACK bits in the PUSCH, a DAI IE is also included in the UL SA (UL DAI IE) scheduling the PUSCH to indicate the number of HARQ-ACK bits the UE should include. For the setup in FIG. 7 where $N_{bundle}$=4, the UL DAI IE can be represented by 2 bits with respective values of $V_{DAI}^{UL}$=0 or 4, 1, 2, 3. If the UE receives a DL SA in the bundling window, then the UL DAI IE bits of "00" map to a UL DAI IE value of $V_{DAI}^{UL}$=4 instead of $V_{DAI}^{UL}$=0.

In order to support high data rates in a communication system, Carrier Aggregation (CA) of multiple cells is considered to provide higher operating BandWidths (BWs). For example, to support communication over 60 MHz, CA of three 20 MHz cells can be used.

FIG. 8 is a diagram illustrating the principle of CA.

Referring to FIG. 8, an operating DL BW of 60 MHz 810 is constructed by the aggregation of 3 cells, DL CC 1 821, DL CC 2 822, and DL CC 3 823, each having a DL BW of 20 MHz. Similarly, an operating UL BW of 60 MHz 830 is constructed by the aggregation of 3 cells, UL CC 1 841, UL CC 2 842, and UL CC 3 843, each having an UL BW of 20 MHz.

For simplicity, in FIG. 8, each cell is assumed to have a unique DL and UL pair (symmetric CA), but it is also possible for more than one DL to be mapped to a single UL and the reverse (asymmetric CA). This mapping is typically UE-specific and the NodeB can configure a set of C cells to a UE, using for example Radio Resource Control (RRC) signaling, and activate a subset of A cells (A≤C) for PDSCH reception in a subframe, using for example Medium Access Control (MAC) signaling (a UE may not monitor inactive cells for communication with the NodeB). If a PDSCH activating or deactivating configured cells is missed, then the UE and the NodeB may have a misunderstanding of the active cells. Moreover, in order to maintain the communication, one cell with a DL/UL pair needs to remain always activated and it is referred to as the primary cell. The PUCCH transmissions from a UE are assumed to be only in its primary cell (Pcell) and HARQ-ACK information is conveyed only in a single PUSCH.

FIG. 9 is a diagram illustrating the parallelization of the DL DAI design in FIG. 7 to multiple DL cells.

Referring to FIG. 9, a NodeB transmits to a UE DL SAs in 3 DL subframes in Cell 0 910 and sets the DL DAI IE values according to the number of DL SAs transmitted to the UE only for PDSCH receptions in Cell 0. In a similar manner, the NodeB transmits to the UE DL SAs in 2 DL subframes in Cell 1 920 and 2 DL subframes in Cell 2 930 and sets the DL DAI IE values according to the number of DL SAs transmitted to the UE only for PDSCH receptions in Cell 1 and Cell 2, respectively.

A fundamental condition for proper communication of the HARQ-ACK information is for a UE and a NodeB to have a same understanding of the HARQ-ACK payload. This includes the same understanding about the ordering of HARQ-ACK information bits across cells and subframes in a transmitted HARQ-ACK codeword and of the coding method used to transmit the HARQ-ACK payload (single RM or dual RM code).

The actual HARQ-ACK payload also needs to be limited as desired reliability requirements are difficult to achieve otherwise. Additionally, the required resources in a PUSCH for transmitting large HARQ-ACK payloads can become excessive and lead to unacceptable overhead or an inability to reliably receive the HARQ-ACK payload. For this reason, the HARQ-ACK payload needs to be compressed and spatial-domain bundling is considered as the first choice, possibly followed by bundling across DL subframes (time-domain bundling) or across cells (cell-domain bundling).

SUMMARY OF THE INVENTION

The present invention has been made to address at least the above problems and/or disadvantages and to provide at least the advantages described below. Accordingly an aspect of the present invention provides methods and apparatus for a UE operating in a TDD communication system and configured with multiple DL cells to determine the coding method for acknowledgement information bits as a function of their number.

In accordance with an aspect of the present invention, a method is provided for a UE to encode acknowledgement information bits for transmission to a base station in a TDD communication system. The acknowledgement information bits are generated for each of a plurality of TTIs and for each of a plurality of cells configured for the UE. One acknowledgement information bit is generated for each cell configured with a Transmission Mode (TM) that conveys one data TB. Two acknowledgement information bits are generated for each cell configured with a TM conveying two data TBs. The acknowledgement information bits corresponding to the plurality of TTIs for each of the plurality of cells are arranged in a first codeword in an order of ascending cell index values. The first codeword is encoded, when a total number of acknowledgement information bits is less than or equal to a predetermined value. Successive acknowledgement information bits from the first codeword are placed into a second codeword and a third codeword, in an alternating manner, and the second codeword and the third codeword are encoded, when the total number of acknowledgement information bits is greater than the predetermined value.

BRIEF DESCRIPTION OF THE DRAWINGS

The above and other aspects, features, and advantages of the present invention will be more apparent from the following detailed description when taken in conjunction with the accompanying drawings, in which:

FIG. 12 is a diagram illustrating the application of HARQ-ACK spatial-domain bundling followed by time-domain bundling that is prioritized for cells without spatial-domain bundling, according to an embodiment of the present invention;

DETAILED DESCRIPTION OF EMBODIMENTS OF THE PRESENT INVENTION

Figure 1:
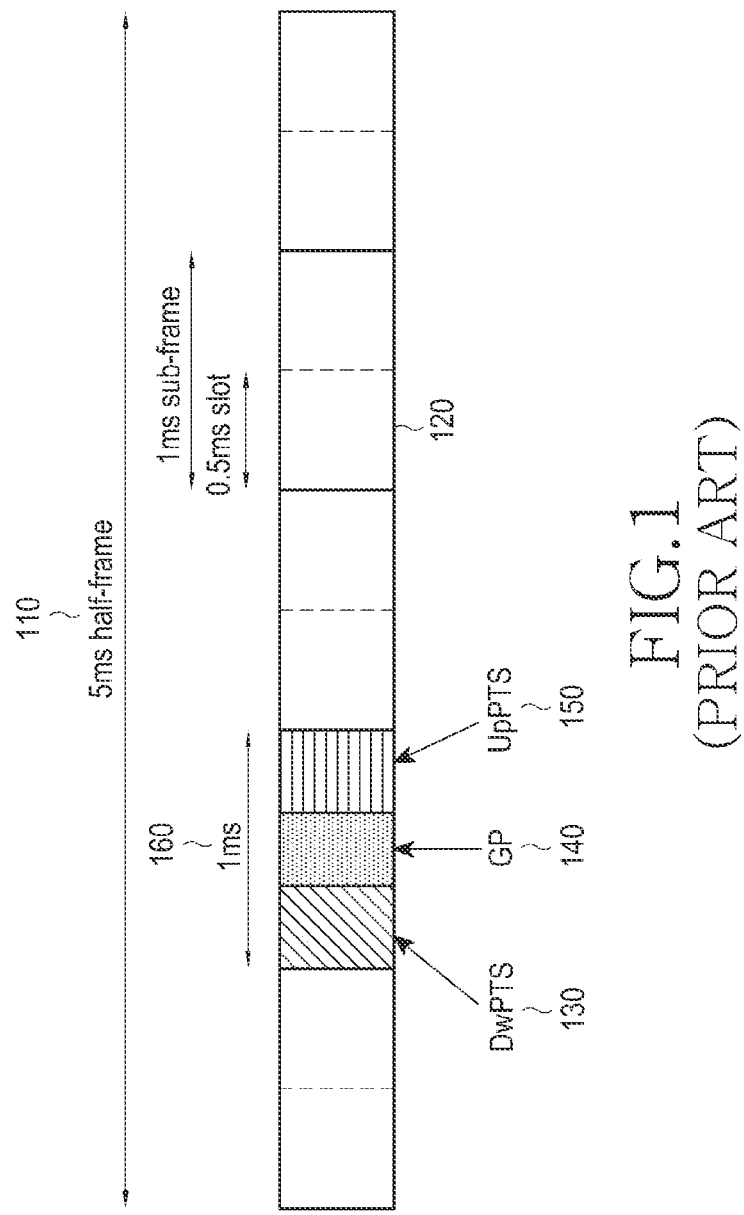
FIG. 1 is a diagram illustrating a frame structure for a TDD system.
Figure 2:
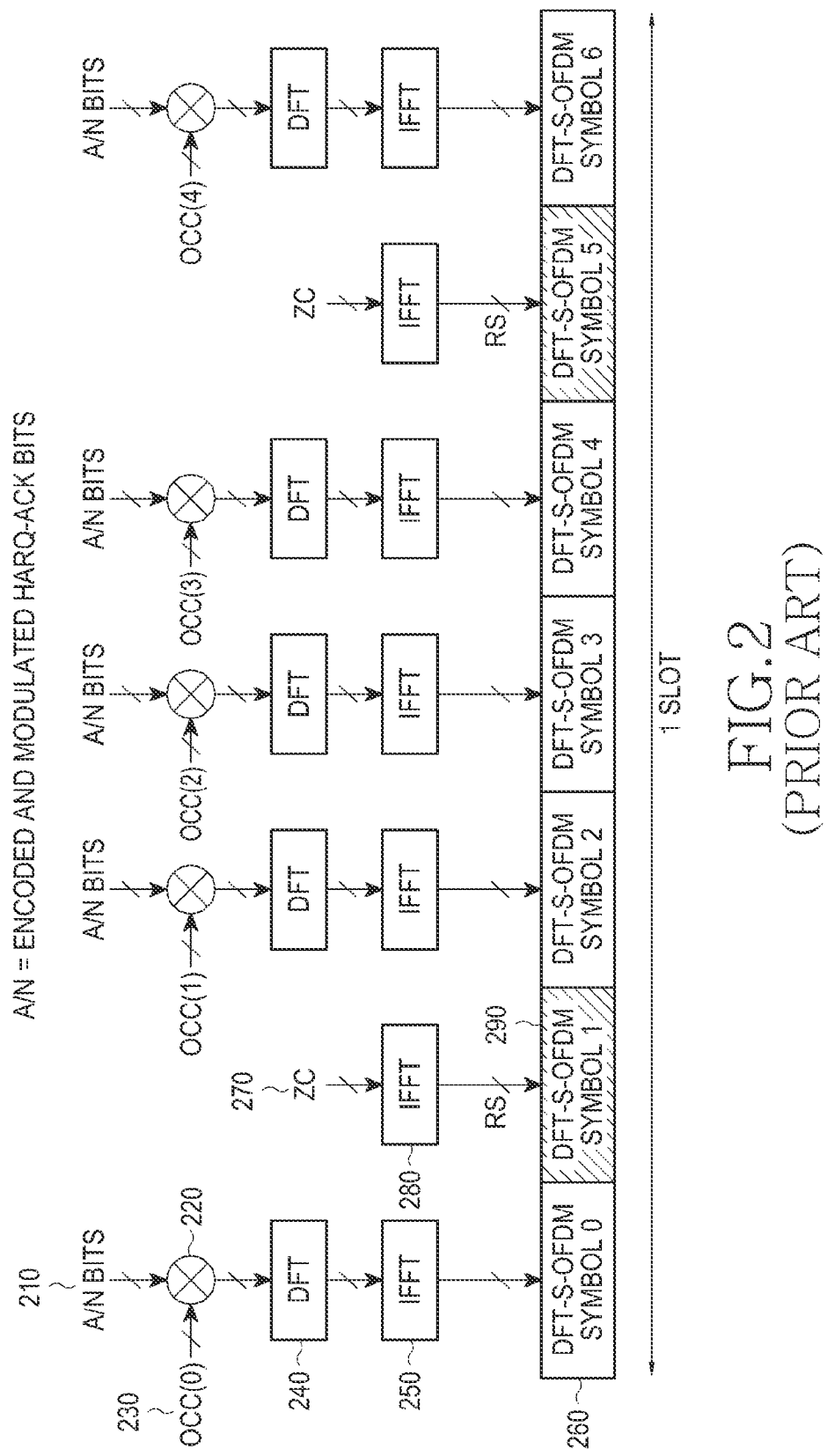
FIG. 2 is a diagram illustrating a conventional PUCCH structure in one subframe slot for transmitting multiple HARQ-ACK information bits using a DFT-S-OFDM transmission method.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Additionally, although the embodiments of the present invention are described below with reference to DFT-spread OFDM transmission, they also are applicable to all Frequency Division Multiplexing (FDM) transmissions in general, and to Single-Carrier Frequency Division Multiple Access (SC-FDMA) and OFDM in particular.

A UE is assumed to generate HARQ-ACK information in response to each TB associated with a DL SA. However, a UE may also deterministically generate HARQ-ACK information associated with each SPS TB the NodeB transmits to the UE at predetermined DL subframes without transmitting a respective DL SA. A UE is understood to include HARQ-ACK information due to SPS PDSCH, when it exists, with the one it generates in response to DL SAs and its placement can be, for example, in the beginning of the HARQ-ACK codeword. A UE is assumed to generate a HARQ-ACK information bit corresponding to each DL SA. The embodiments of the present invention relate the configured cells to a UE but may also directly apply if the activated cells are instead considered.

The embodiments of the present invention consider aspects for the determination of the coding method for HARQ-ACK information bits in a PUCCH or in a PUSCH as a function of the HARQ-ACK payload, and for the partitioning of the HARQ-ACK information bits in a dual RM code. It is assumed that a single RM code is used if the HARQ-ACK payload is less than or equal to $S_1$ bits, and that a dual RM code is used if the HARQ-ACK payload is greater than $S_1$ bits but less than or equal to $S_2$ bits. If the HARQ-ACK payload is greater than $S_2$ bits, selective or full spatial-domain bundling applies to reduce the HARQ-ACK payload to $S_2$ bits or below $S_2$ bits, respectively. If, after full spatial-domain bundling, the HARQ-ACK payload continues to exceed $S_2$ bits, time-domain bundling or cell-domain bundling are additionally performed until the HARQ-ACK payload becomes less than or equal to $S_2$ bits.

For a UE with C configured cells, $N_{DAI}^{DL}(c)$ denotes a number of DL SAs the UE determines as being transmitted from a NodeB based on DL DAI IEs in DL SAs the UE detects in a bundling window of $N_{bundle}$ subframes, and $Q_{add}(c)$ denotes a number of additional DL SAs the UE may not be able to determine from the DL DAI IE in the DL SAs it detects (for example, $Q_{add}(c)=0$ if the UE detects a DL SA in the last DL subframe of the bundling window in cell c and $Q_{add}(c)=1$ otherwise). $TB_{max}(c)$ denotes the maximum number of TBs a UE may receive in a subframe in cell c according to the configured PDSCH TM, the HARQ-ACK payload without spatial-domain bundling in a PUCCH or in a PUSCH not associated with an UL SA can be determined without misunderstanding between the NodeB and the UE as shown in Equation (2) below.

$$O_{HARQ-ACK} = \sum_{c=0}^{C-1} (N_{DAI}^{DL}(c) + Q_{add}(c)) \cdot TB_{max}(c). \quad (2)$$

Depending on the DL DAI design, the HARQ-ACK payload may be determined differently than in Equation (2), but the exact determination is not material to embodiments of the present invention and Equation (2) only serves as an example. For example, an alternative approach to compute the HARQ-ACK payload is $O_{HARQ-ACK}=N_{bundle} \cdot (C+C_2)$, where $C_2$ is a number of cells for which the UE is configured a TM enabling the reception of 2 TBs per subframe.

Based on the value of $O_{HARQ-ACK}$, the coding method for a HARQ-ACK transmission in a PUCCH is determined as follows:

a) If $2 \leq O_{HARQ-ACK} \leq S_1$, single RM code is used without spatial-domain bundling
  a. As DL CA implies the existence of at least C=2 cells, the minimum value for $O_{HARQ-ACK}$ is obtained for $N_{DAI}^{DL}(c)=1$, $Q_{add}(c)=0$ and $TB_{max}(c)=1$.
  b. Although a different coding method can be used for the transmission of $O_{HARQ-ACK}=2$ bits in the PUSCH, for simplicity the single RM code is assumed.
b) If $S_1 < O_{HARQ-ACK} \leq S_2$, dual RM code is used without spatial-domain bundling.
c) If $S_2 < O_{HARQ-ACK}$, dual RM code is used with spatial-domain bundling and possible time-domain or cell-domain bundling.

The first aspect of embodiments of the present invention focuses on the case that $S_2 < O_{HARQ-ACK}$ and considers the selection of a single RM code or a dual RM code and the application of bundling in various domains. Assuming that a UE is assigned for each cell a unique Cell_Index value, HARQ-ACK spatial-domain bundling corresponding to the last DL subframe in the bundling window is performed first starting from the cell with the largest (or smallest) Cell_Index, considering only cells with configured TM enabling the reception of 2 TBs, and continuing first across the cell-domain and subsequently across the time-domain in an iterative fashion. Spatial-domain bundling in the primary cell, if the UE is configured a TM enabling reception of 2 TBs in the primary cell, may be performed last regardless of the respective Cell_Index. The reason for first performing spatial-domain bundling across the cell-domain is to minimize or avoid penalizing some cells more than other cells. The reason for first performing spatial-domain bundling for the last subframe of the bundling window is because it is the one more likely to not convey actual HARQ-ACK information bits (as a UE cannot identify whether it failed to detect a DL SA in the last subframe) and therefore the impact of information loss due to bundling can be minimized.

Figure 10:
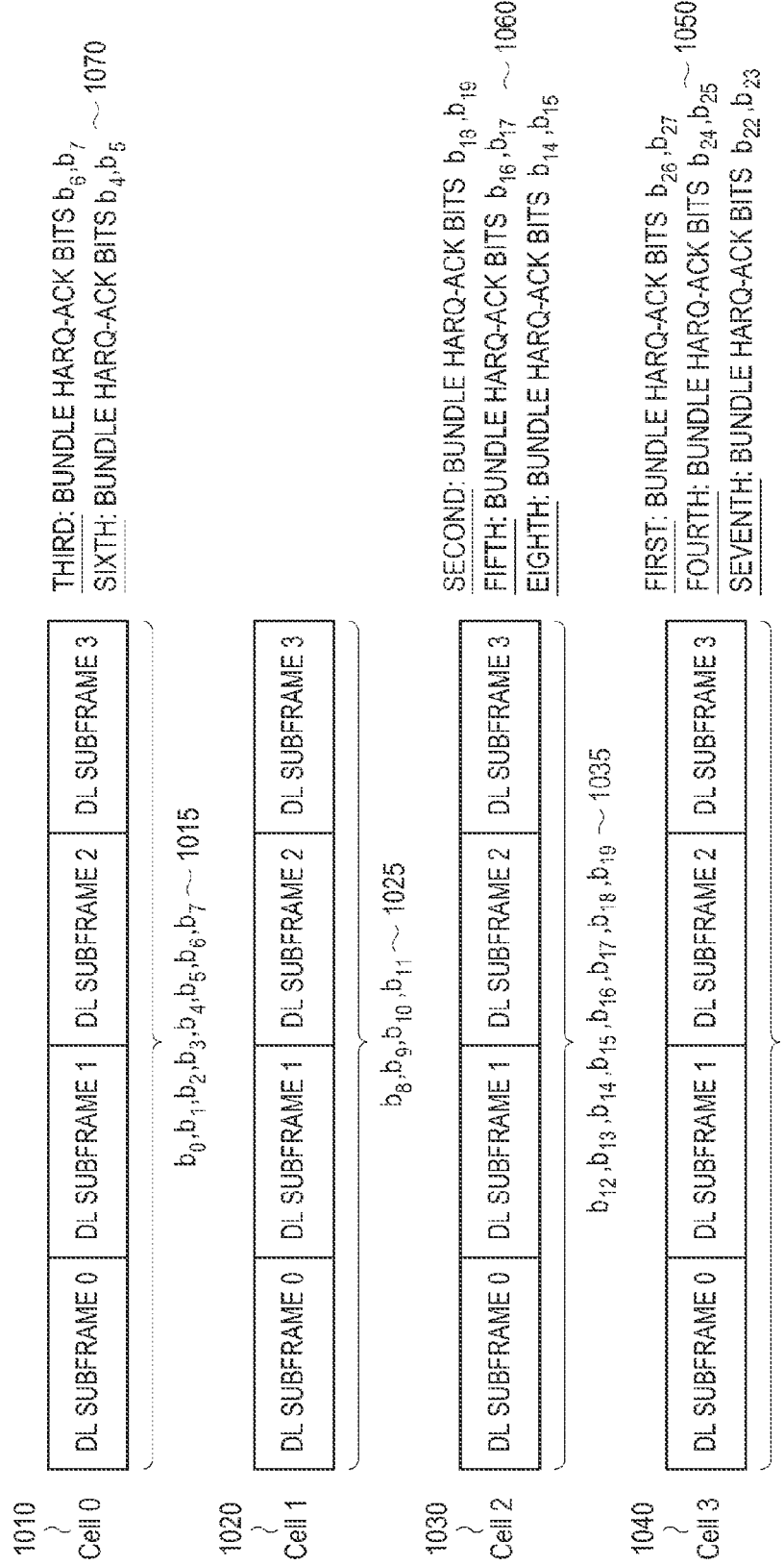
FIG. 10 is a diagram illustrating the application of HARQ-ACK spatial-domain bundling across cells and subframes, according to an embodiment of the present invention.

FIG. 10 is a diagram illustrating the application of HARQ-ACK spatial-domain bundling across cells and subframes, according to an embodiment of the present invention.

Referring to FIG. 10, the Cell_Index of each cell is represented by a respective number. In a Cell 0 1010, a Cell 2 1030, and a Cell 3 1040, a UE is configured a TM enabling reception of 2 TBs per DL subframe, and for $N_{DAI}^{DL}(c)=3$ DL subframes ($Q_{add}(c)=1$), it generates 8 HARQ-ACK bits, 1015, 1035, and 1045, for each of these cells, respectively. The order of the HARQ-ACK bits is the same as the order of the DL subframes they correspond to. In a Cell 1 1020, the UE is configured a TM enabling reception of 1 TB per DL subframe and it generates 4 HARQ-ACK bits, 1025. Therefore, the total number of HARQ-ACK bits is 28. Assuming that $S_2=20$, spatial-domain bundling of 8 HARQ-ACK pairs is needed and it begins from the last subframe in the bundling window of $N_{bundle}=4$ subframes (DL subframe 3) and from the cell with the largest Cell_Index (or the smallest Cell_Index) and continues sequentially in decreasing (or increasing) Cell_Index order, for cells having configured a TM enabling transmission of 2 TBs, until the cell with the smallest Cell_Index, if needed. Therefore, spatial-domain bundling is performed for the HARQ-ACK bits corresponding to DL subframes 3, 2, and 1 of Cell 3, for the HARQ-ACK bits corresponding to DL subframes 3, 2, and 1 of Cell 2, and for DL subframes 3 and 2 of Cell 0, resulting in bundle HARQ-ACK bits 1050, 1060 and 1070, respectively The primary cell may be considered last for spatial-domain bundling. This is because scheduling may occur more often in the primary cell than in other cells, and therefore it is more likely that spatial-domain bundling in the primary cell will apply to actual HARQ-ACK bits instead of preferably applying to HARQ-ACK bits not associated with actual DL SAs. The latter HARQ-ACK bits are generated to achieve the predetermined HARQ-ACK codeword size of $O_{HARQ-ACK}$ bits and do not carry any information (they are filler bits set to a NACK value that the NodeB decoder knows in advance as they correspond to DL SAs the NodeB did not transmit). Moreover, the primary cell may convey data with higher priority than the data in the remaining cells and it may be desirable to not compress the HARQ-ACK information through spatial-domain bundling.

An alternative approach for performing spatial-domain bundling is for the NodeB to configure a UE through RRC signaling the order of the cells for which the UE should perform spatial-domain bundling. Therefore, the Cell_Index can be viewed as being replaced by the NodeB configured order for a set of configured cells for which the UE should perform spatial-domain bundling. Additionally, the NodeB may also configure, to a UE, the starting subframe for spatial-domain bundling.

If a UE receives an UL SA for PUSCH transmission in a same UL subframe as the expected HARQ-ACK signal transmission, and the HARQ-ACK information is included in the PUSCH, the HARQ-ACK payload is determined as set forth below in Equation (3).

$$O_{HARQ-ACK}=V_{DAI}^{UL}\cdot(C+C_2) \quad (3)$$

Equation (3) assumes that $V_{DAI}^{UL}$ indicates the cell with the largest number of DL SAs and that HARQ-ACK bits are generated for all cells assuming the transmission of $V_{DAI}^{UL}$ DL SAs in each cell regardless of the actual number of DL SAs in each cell. The UE can use a NACK value for HARQ-ACK information bits in a cell that do not correspond to a received TB or DL SA (filler bits in order to transmit a total of $O_{HARQ-ACK}$ bits as in Equation (3)). If the HARQ-ACK payload determined with Equation (2) is smaller than the one determined with Equation (3), the former one may be considered regardless of the UL DAI IE value.

For $V_{DAI}^{UL}=3$ and $N_{bundle}=4$, the HARQ-ACK payload in a PUSCH for C=4 and $C_2=3$, is reduced from $$O_{HARQ-ACK}=\sum_{c=0}^{C-1}(N_{DAI}^{DL}(c)+Q_{add}(c))\cdot TB_{max}(c)=28$$

bits (or from $O_{HARQ-ACK}=N_{bundle}\cdot(C+C_2)=28$ bits) to $O_{HARQ-ACK}=V_{DAI}^{UL}\cdot(C+C_2)=21$ bits. Consequently, assuming that $S_2=20$, spatial-domain bundling for only 1 HARQ-ACK pair is needed.

Figure 11:
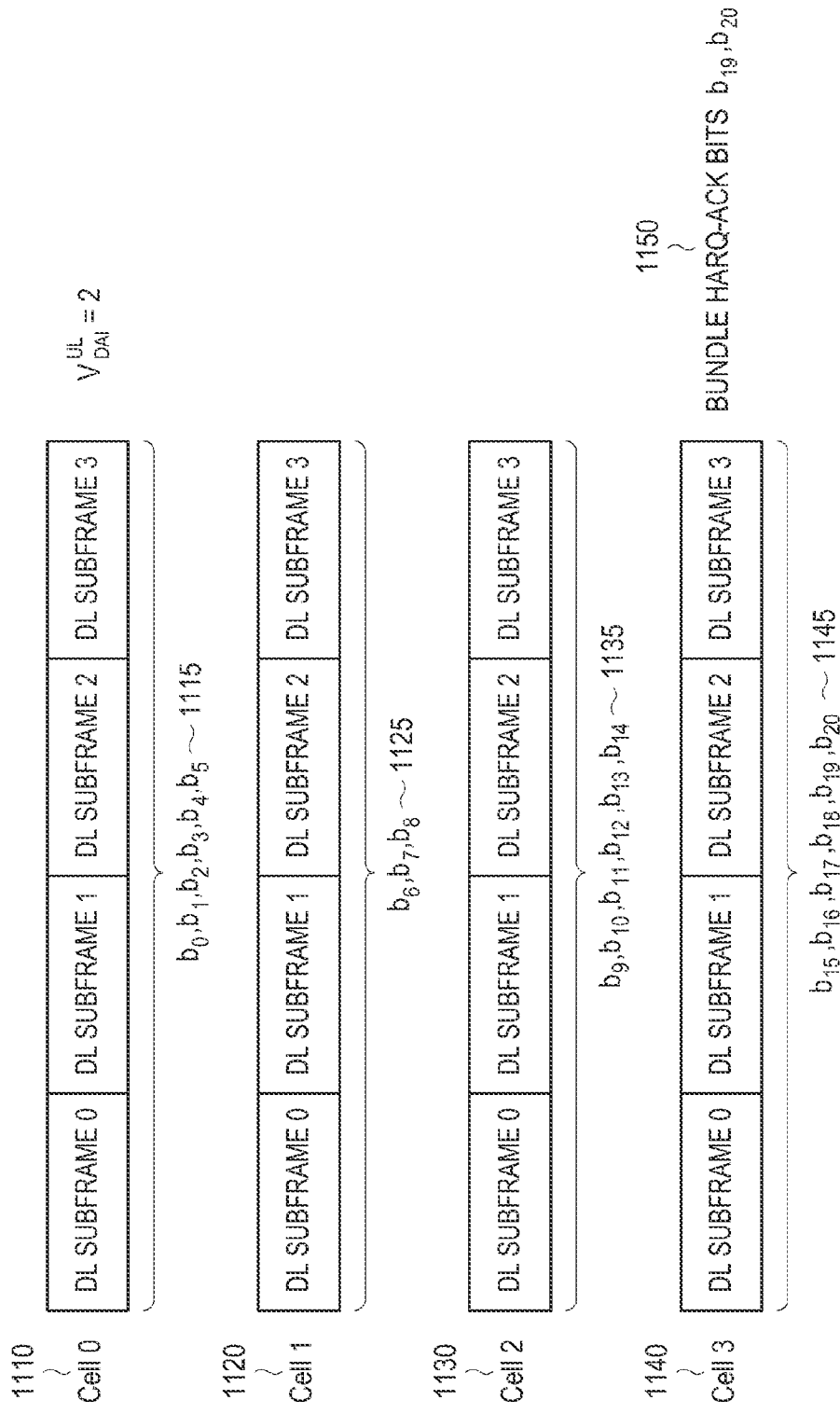
FIG. 11 is a diagram illustrating the application of HARQ-ACK spatial-domain bundling in a PUSCH associated with a UL SA conveying an UL DAI IE, according to an embodiment of the present invention.

FIG. 11 is a diagram illustrating the application of HARQ-ACK spatial-domain bundling in a PUSCH associated with a UL SA conveying an UL DAI IE, according to an embodiment of the present invention.

Referring to FIG. 11, the Cell_Index of each cell is represented by a respective number. In a Cell 0 1110, a Cell 2 1130, and a Cell 3 1140, a UE is configured a TM enabling reception of 2 TBs per DL subframe, and for $V_{DAI}^{UL}=3$, it generates 6 HARQ-ACK bits, 1115, 1135, and 1145, for each of these cells, respectively. The order of the HARQ-ACK bits is the same as the order of the DL subframes they correspond to. In a Cell 1 1120, the UE is configured a TM enabling reception of 1 TB per DL subframe, and for $V_{DAI}^{UL}=3$, it generates 3 HARQ-ACK bits, 1125. Therefore, the total number of HARQ-ACK bits is 21. As spatial-domain bundling of HARQ-ACK bits begins from the last subframe in the bundling window (DL subframe 3) and from the cell with the largest Cell_Index, it is only performed for the HARQ-ACK bits corresponding to DL subframe 3 of Cell 3, resulting in bundle HARQ-ACK bits 1150.

If spatial-domain bundling is not sufficient to reduce the HARQ-ACK payload at or below $S_2$ bits, time-domain bundling and/or cell-domain bundling are additionally applied. Assuming that time-domain bundling is performed first (although the reverse may also apply), as spatial-domain bundling already compresses the HARQ-ACK information for 2 TBs into 1 HARQ-ACK bit, time-domain bundling is prioritized in cells where spatial-domain bundling is not performed (that is, in cells where the configured TM enables the reception by the UE of only 1 TB). Otherwise, if time-domain bundling is performed on cells for which spatial-domain bundling is also performed, the HARQ-ACK information for 4 TBs would be further compressed into 1 HARQ-ACK which is not desirable, as it increases the loss in system throughput due to the compressed HARQ-ACK information.

FIG. 12 is a diagram illustrating the application of HARQ-ACK spatial-domain bundling followed by time-domain bundling that is prioritized for cells without spatial-domain bundling, according to an embodiment of the present invention.

Referring to FIG. 12, the order of cells for spatial-domain bundling is not material as spatial-domain bundling is performed over all cells it is applicable, a Cell 0 1210, a Cell 2 1230, a Cell 3 1240, and a Cell 4 1250 and, for a bundling window size of $N_{bundle}=4$ DL subframes, the respective 8 HARQ-ACK bits, 1215, 1235, 1245, and 1255, are compressed into respective 4 HARQ-ACK bits, 1218, 1238, 1248, and 1258. As the total number of Q=24 HARQ-ACK bits after spatial-domain bundling is above $S_2=20$, time-domain bundling for a Cell 1 1220, and a Cell 5 1260 follows. The bundling size in the time-domain in each applicable cell is determined from the required reduction in HARQ-ACK bits as $\lceil(Q-S_2)\cdot N_{bundle}/C_1\rceil$ (or, for the last cell where time-domain bundling is performed, as $\lfloor(Q-S_2)\cdot N_{bundle}/C_1\rfloor$), where $\lfloor\ \rfloor$ is the "floor" function which rounds a number to its lower integer and $C_1$ is the number of cells having configured TM enabling the reception of only 1 TB. Then, the original 4 HARQ-ACK bits, 1225 and 1265, are compressed into respective 2 HARQ-ACK bits, 1228 and 1268.

The order of the cells for the application of time-domain bundling can be based on the respective "Cell_Index", or can be configured for each UE by the NodeB and time-domain bundling on the primary cell may be performed last.

Figure 3:
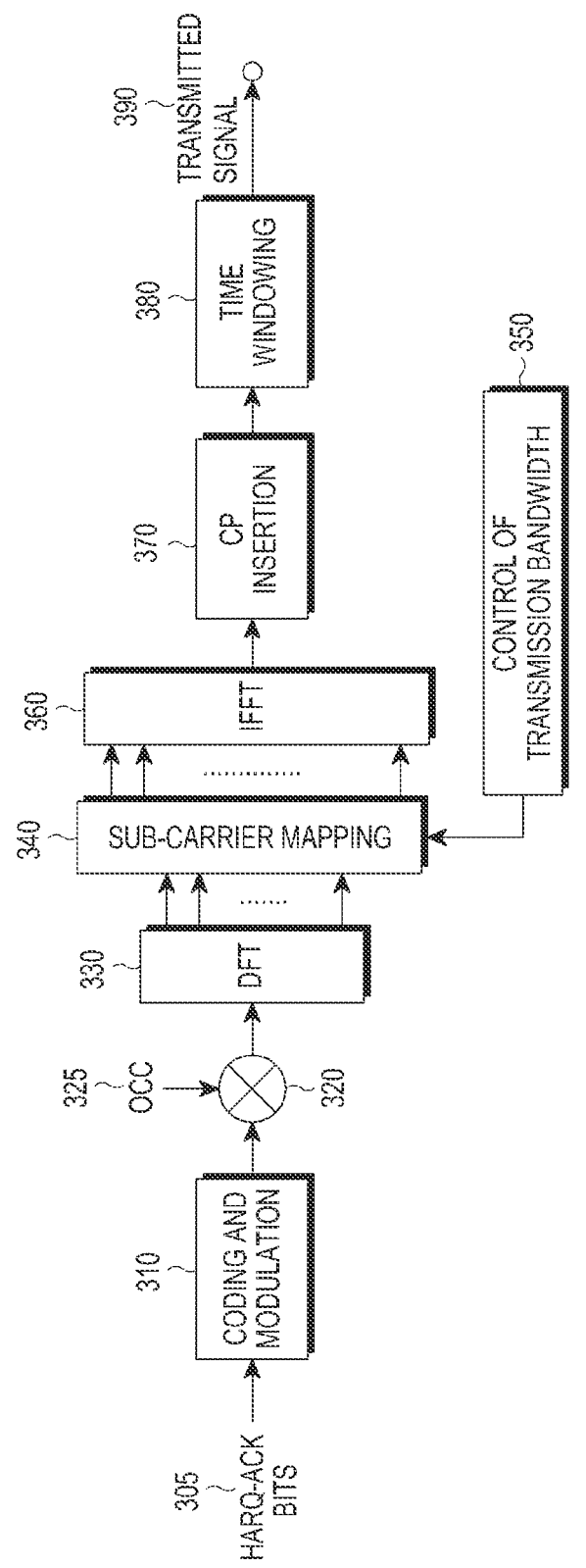
FIG. 3 is a block diagram illustrating a transmitter for transmitting HARQ-ACK information encoded using a single RM code.
Figure 4:
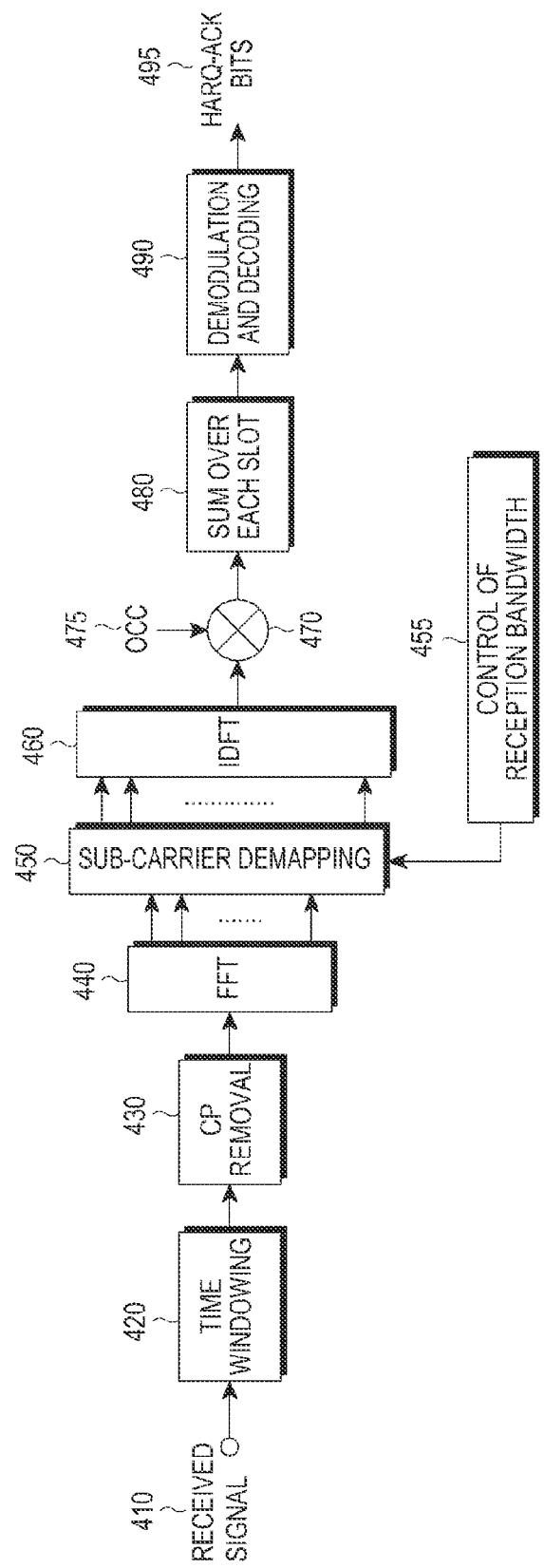
FIG. 4 is a block diagram illustrating a receiver for receiving HARQ-ACK information encoded using a single RM code.
Figure 5:
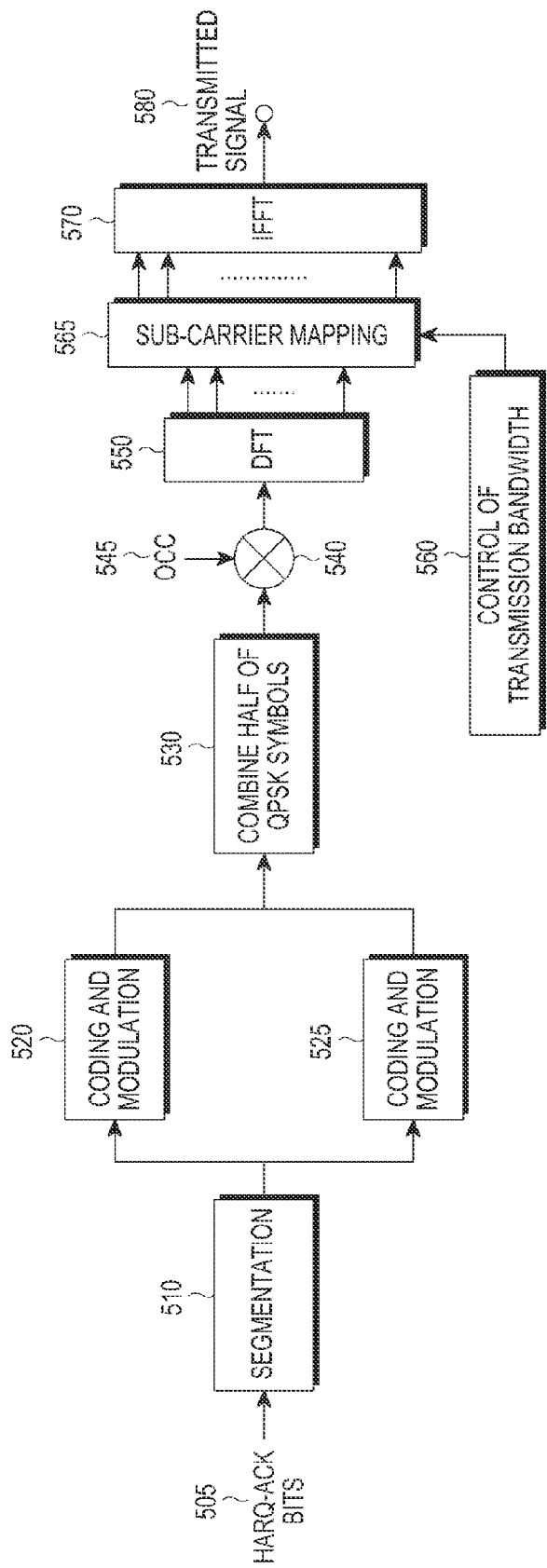
FIG. 5 is a block diagram illustrating a transmitter for transmitting HARQ-ACK information encoded using a dual RM code.
Figure 6:
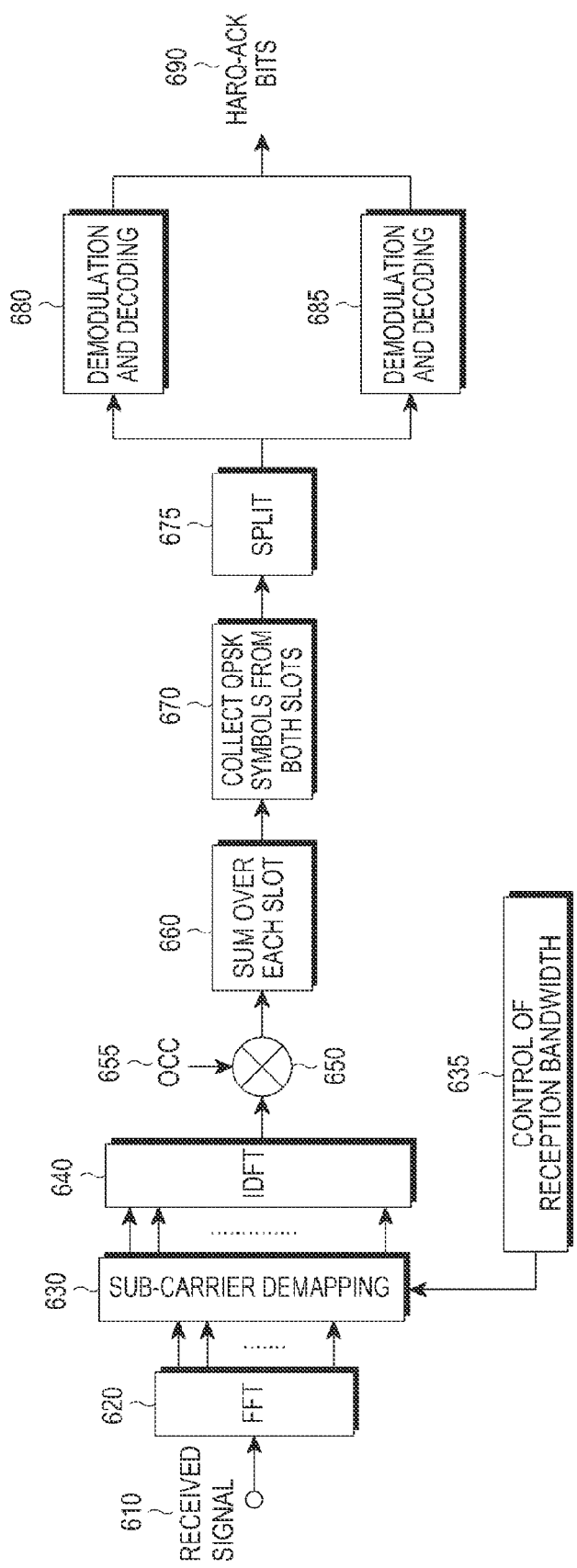
FIG. 6 is a block diagram illustrating a receiver for receiving HARQ-ACK information encoded using a dual RM code.
Figure 7:
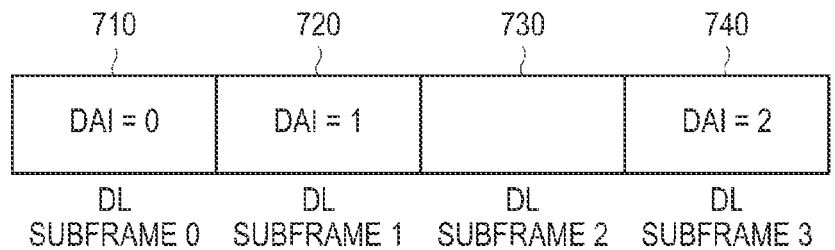
FIG. 7 is a diagram illustrating a setting for a DL DAI IE over 4 DL subframes of a bundling window.
Figure 8:
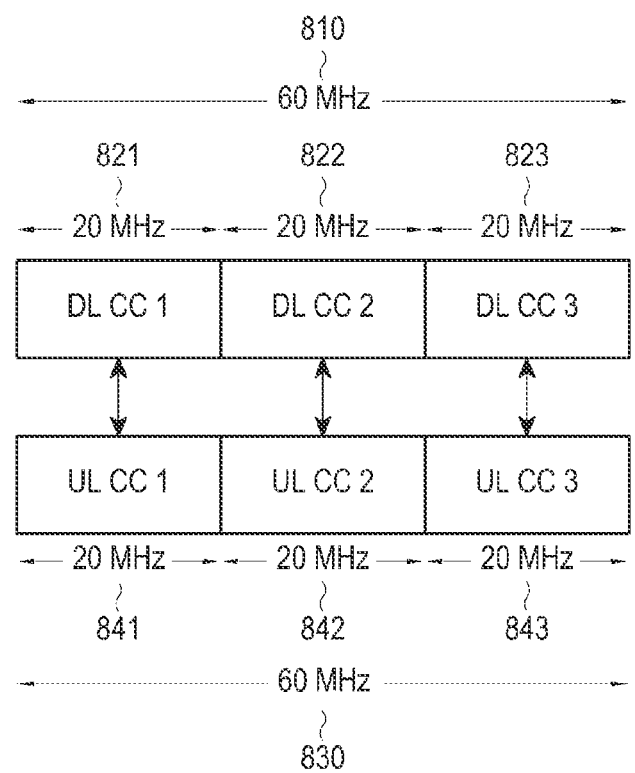
FIG. 8 is a diagram illustrating the principle of CA.
Figure 9:
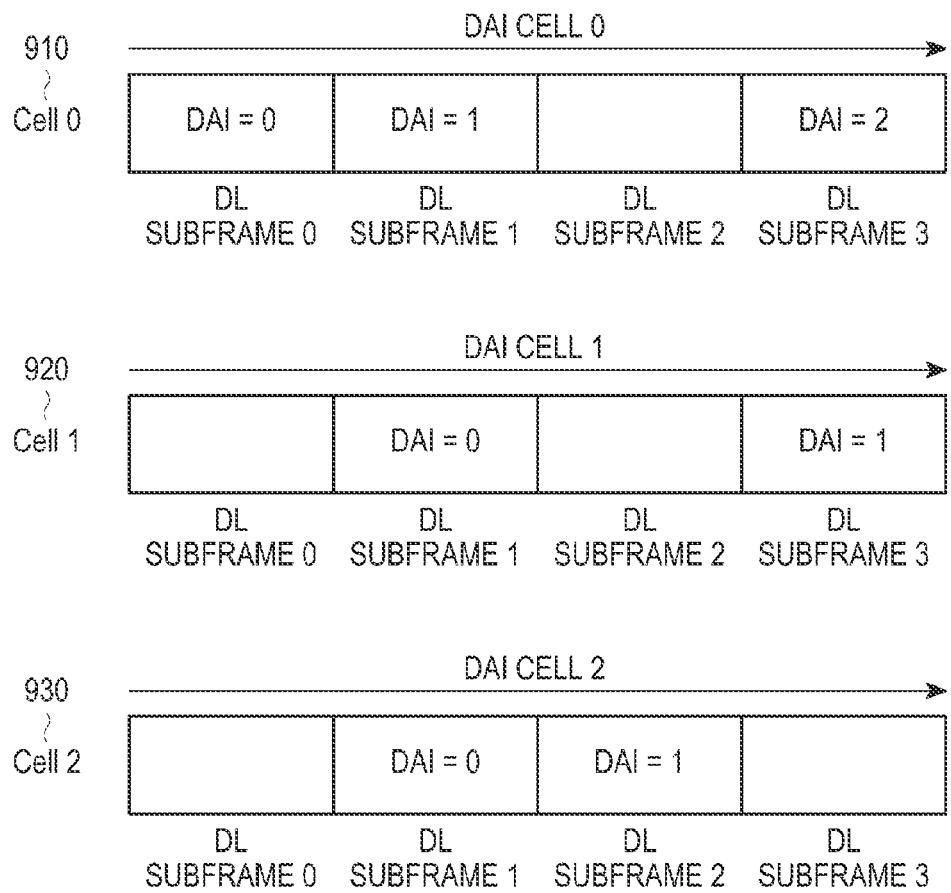
FIG. 9 is a diagram illustrating a parallelization of the DL DAI IE design in FIG. 7 to multiple DL cells.

For HARQ-ACK transmission in a PUCCH, the required resources for a maximum payload already exist, such as, for example, for the transmission of 10 bits in FIG. 3 or the transmission of 20 bits in FIG. 5, and further reduction of the HARQ-ACK payload below the maximum will not result in overhead reduction. This is not the case for the HARQ-ACK transmission in the PUSCH, where the required resources increase as the HARQ-ACK payload increases (for example, as indicated in Equation (1)). For very large HARQ-ACK payloads, such as, for example, 10 bits or above, the overhead introduced by HARQ-ACK multiplexing in a PUSCH can be substantial and affect the data reception reliability, particularly if it is not associated with an UL SA (as, for example, for an SPS transmission or a non-adaptive HARQ retransmission where the maximum possible HARQ-ACK payload may be assumed). Moreover, the maximum resources that can be allocated to HARQ-ACK multiplexing in a PUSCH may not be sufficient to ensure a desired HARQ-ACK reception reliability.

The second aspect of embodiments of the present invention addresses the issue by considering that additional bundling can be applied to a HARQ-ACK transmission in a PUSCH relative to one in a PUCCH in order to achieve a smaller HARQ-ACK payload in a PUSCH. For example, the HARQ-ACK payload in a PUCCH may be allowed to be up to $S_2$ bits while the HARQ-ACK payload in a PUSCH may be allowed to be up to $S_0$ bits with $S_0<S_2$ (for example, $S_0=S_1$).

The process for the additional HARQ-ACK bundling in a PUSCH can follow the same principles as previously described in FIG. 10 and FIG. 12, where it is first performed in the spatial-domain and, if additional bundling is needed to achieve the maximum allowed HARQ-ACK payload, it continues in the time-domain (or in the cell-domain). Unlike HARQ-ACK transmission in a PUCCH, where the application or not of HARQ-ACK bundling is default according to the maximum HARQ-ACK payload that can be supported by a respective PUCCH structure (that is, according to the values of $S_1$ and $S_2$), the application of HARQ-ACK bundling in a PUSCH may further depend on the parameters of the PUSCH transmission, such as its size and/or the MCS for the data transmission, and $S_0$ is then a function of these parameters.

In a first approach, the value of $S_0$ can be predetermined, for example, to be equal to $S_1$. Then, although HARQ-ACK bundling in a PUCCH applies until the HARQ-ACK payload is compressed to $S_2$ bits and a dual RM code is used, additional HARQ-ACK bundling can apply for HARQ-ACK transmission in a PUSCH until the HARQ-ACK payload is compressed to $S_1$ bits and single RM code is always used.

In a second approach, the value of $S_0$ is dynamically computed depending on the PUSCH transmission parameters. One such parameter is the MCS of the data transmission. For example, $S_0=S_1$ if the MCS is below a predetermined threshold $MCS_{thr}$ while $S_0=S_2$ otherwise. This is motivated by the fact that the MCS of the data transmission, or equivalently the spectral efficiency of the data transmission, determines the PUSCH resources required for HARQ-ACK multiplexing in the PUSCH, for example as indicated in Equation (1). Then, in order to avoid a substantial HARQ-ACK overhead particularly for PUSCH transmissions with relatively low data spectral efficiency, a larger amount of HARQ-ACK bundling can apply for MCS below $MCS_{thr}$ in order to improve the reception reliability for both the data and HARQ-ACK information.

In a third approach, the value of $S_0$ is dynamically computed depending on the size of a PUSCH transmission ($M_{sc}^{PUSCH}$), which also determines the maximum amount of resources available for HARQ-ACK multiplexing in the PUSCH, for example as described in Equation (1). In that case, $S_0$ may be determined as $S_0 = \lfloor 4 \cdot M_{sc}^{PUSCH} \cdot Q_m / M_r \rfloor$ where $M_r$ is a predetermined number, such as for example 2, ensuring that the resulting RM code rate will not exceed $1/M_r$.

Figure 13:
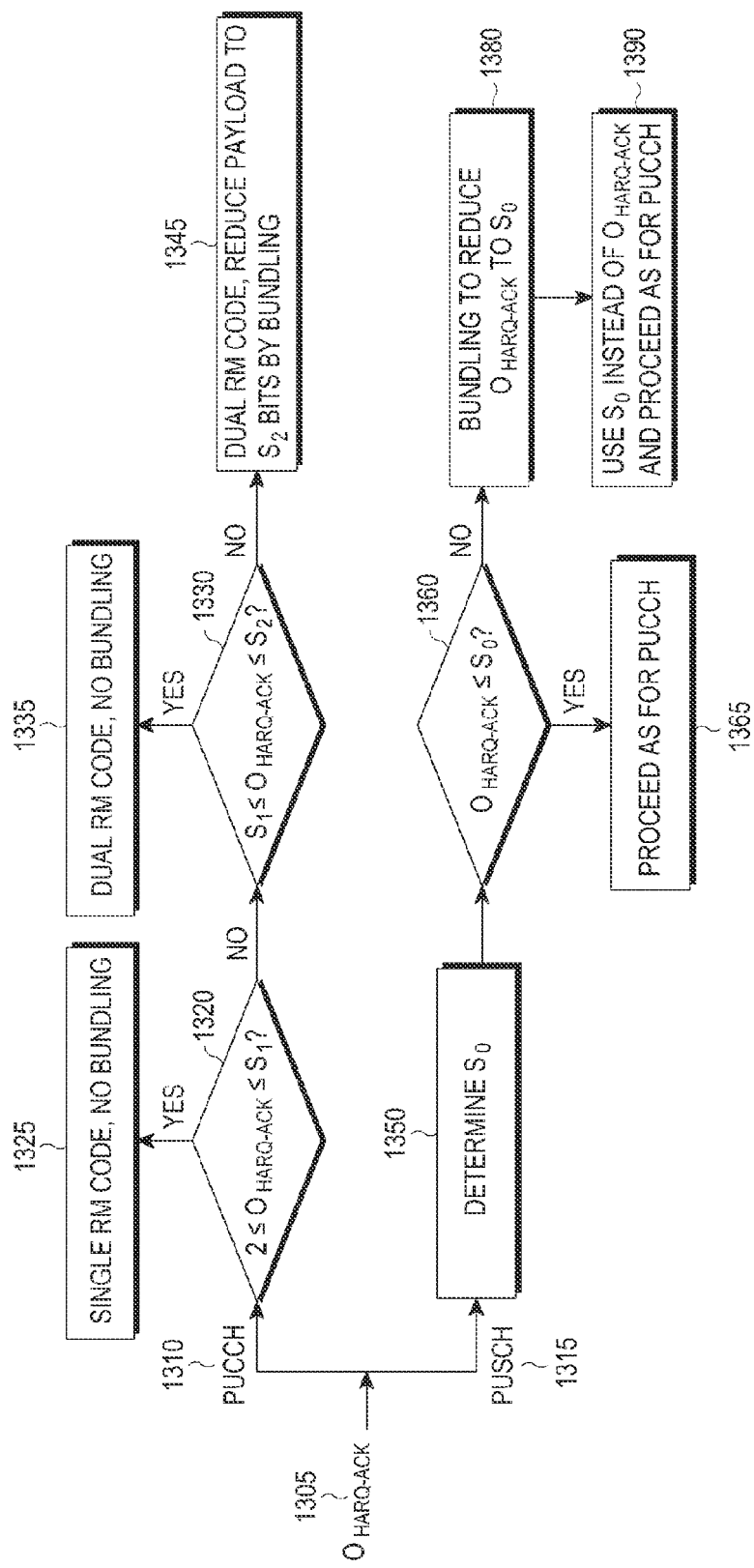
FIG. 13 is a diagram illustrating the application of different HARQ-ACK bundling in a PUSCH relative to a PUCCH, according to an embodiment of the present invention.

FIG. 13 is a diagram illustrating the principle of applying different HARQ-ACK bundling in a PUSCH relative to a PUCCH, according to an embodiment of the present invention.

Referring to FIG. 13, for transmission of a HARQ-ACK payload of $O_{HARQ-ACK}$ bits 1305 in a PUCCH 1310, if $O_{HARQ-ACK} \leq S_1$ in step 1320 a single RM code and no bundling are used at step 1325. Alternatively, it is determined if $S_1 < O_{HARQ-ACK} \leq S_2$ in step 1330. If so, a dual RM code and no bundling are used in step 1335, while if not, $S_2 < O_{HARQ-ACK}$, and a dual RM code and HARQ-ACK bundling as previously described are used in step 1345. For HARQ-ACK transmission in a PUSCH 1315, $S_0$ is first determined as previously described, in step 1350. In block 1360 it is determined if $O_{HARQ-ACK} \leq S_0$. If so, the same process for the HARQ-ACK payload determination (whether bundling is performed) and encoding as for transmission in the PUCCH applies, in step 1365. Otherwise, HARQ-ACK bundling applies to reduce the HARQ-ACK payload from $O_{HARQ-ACK}$ to $S_0$ in step 1380. Subsequently, the same process for the HARQ-ACK payload determination (whether bundling is performed) and encoding as for transmission in the PUCCH applies in step 1390, with the exception that instead of the initial payload of $O_{HARQ-ACK}$ bits, the compressed through bundling payload of $S_0$ bits is used.

When $S_1 < O_{HARQ-ACK} \leq S_2$ and a dual RM code is used, the reception reliability of the HARQ-ACK information should be ensured by minimizing or avoiding unequal error rate protection between the two HARQ-ACK codewords of the dual RM code and by ensuring that no codeword experiences a high code rate which may adversely affect the reception reliability of the respective HARQ-ACK codeword. As previously described, one codeword of the dual RM code should not mostly contain HARQ-ACK bits associated with actual DL SAs while the other codeword of the dual mostly contains HARQ-ACK bits not associated with actual DL SAs that are generated instead only to achieve a predetermined HARQ-ACK codeword size of $O_{HARQ-ACK}$ bits and do not carry any information (filler bits).

The third aspect of embodiments of the present invention considers the partitioning of HARQ-ACK bits in the 2 codewords for a dual RM code. As previously described with respect to FIG. 5, instead of placing the first $S_1$ HARQ-ACK bits in the first of the two RM codes and the remaining $O_{HARQ-ACK}-S_1$ HARQ-ACK bits in the second of the two RM codes, a practically equal split of the HARQ-ACK payload in each of the two RM codes is considered by providing $O_{HARQ-ACK}^1 = \lceil O_{HARQ-ACK}/2 \rceil$ HARQ-ACK bits to the first of the two RM codes and providing the remaining $O_{HARQ-ACK}^2 = \lfloor O_{HARQ-ACK}/2 \rfloor$ HARQ-ACK bits to the second of the two RM codes.

Embodiments of the present invention consider that if additional UL control information, other than HARQ-ACK, with payload of $O_{other\_UCI}$ bits is jointly coded with HARQ-ACK information in a PUCCH, a practically equal split between the two RM codes also applies for the $O_{other\_UCI}$ bits (assuming $S_1 < O_{HARQ-ACK} + O_{other\_UCI} \leq S_2$). For example, the additional control information may be a Service Request Indicator (SRI) or Channel State Information (CSI). Then, $\lceil O_{other\_UCI}/2 \rceil$ bits of the additional control information are provided to the first of the two RM codes and the remaining $\lfloor O_{other\_UCI}/2 \rfloor$ bits of the additional control information are provided to the second of the two RM codes. Although all $O_{other\_UCI}$ bits represent actual information, the reason for an equal split between the 2 RM codewords is to maintain the equal split of the $O_{HARQ-ACK}$ bits while achieving a balance in the different types of information bits conveyed by each of the 2 RM codewords.

The splitting of the HARQ-ACK bits and the bits of other UL control information can be by alternating the bits from the initial payloads of $O_{HARQ-ACK}$ bits, and $O_{other\_UCI}$ bits (if any), into the respective first and second codewords of the dual RM code in order to avoid unequal code rates between the two codewords (as, otherwise, one codeword may mostly contain HARQ-ACK bits associated with actual DL SAs while the other codeword may mostly contain HARQ-ACK bits not associated with actual DL SAs that are instead generated to achieve a predetermined HARQ-ACK codeword size and do not carry any information).

Figure 14:
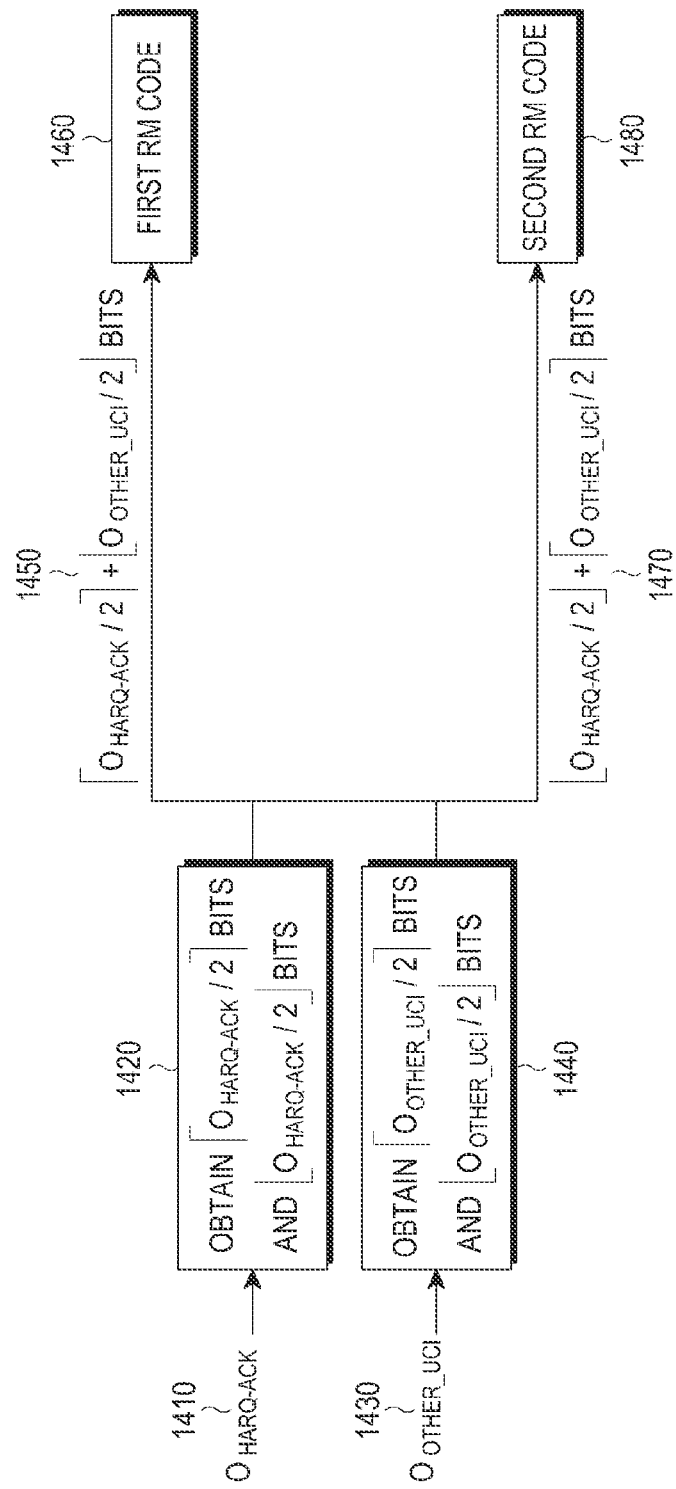
FIG. 14 is a diagram illustrating a first splitting of HARQ-ACK information bits and of other UL control information bits, if any, for coding with 2 RM codes, according to an embodiment of the present invention.

FIG. 14 is a diagram illustrating a first splitting of HARQ-ACK information bits and of other UL control information bits, if any, for coding with 2 RM codes, according to an embodiment of the present invention.

Referring to FIG. 14, a HARQ-ACK payload 1410 is divided into $\lceil O_{HARQ-ACK}/2 \rceil$ bits and $\lfloor O_{HARQ-ACK}/2 \rfloor$ bits 1420. The payload of other UL control information 1430, if any, is divided into $\lceil O_{other\_UCI}/2 \rceil$ bits and $\lfloor O_{other\_UCI}/2 \rfloor$ bits 1440. Subsequently, $\lceil O_{HARQ-ACK}/2 \rceil + \lfloor O_{other\_UCI}/2 \rfloor$ bits 1450 are provided to a first RM code 1460 and $\lfloor O_{HARQ-ACK}/2 \rfloor + \lceil O_{other\_UCI}/2 \rceil$ bits 1470 are provided to a second RM code 1480.

Figure 15:
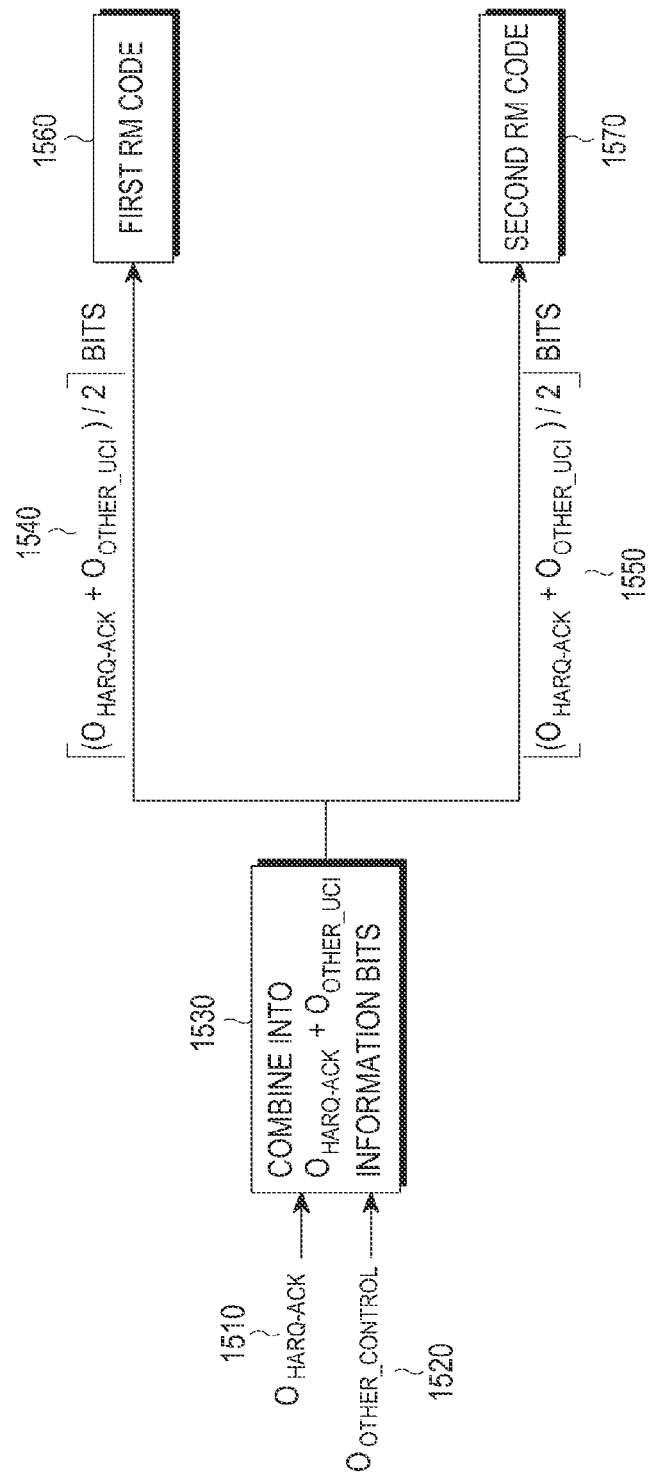
FIG. 15 is a diagram illustrating a second splitting of HARQ-ACK information bits and of other UL control infor-

FIG. 15 is a diagram illustrating a second splitting of HARQ-ACK information bits and of other UL control information bits, if any, for coding with 2 RM codes, according to an embodiment of the present invention.

Referring to FIG. 15, a HARQ-ACK payload $O_{HARQ-ACK}$ 1510 is appended other UL control information payload $O_{other\_UCI}$ 1520 and the combined payload is placed into a first codeword of $O_{HARQ-ACK}+O_{other\_UCI}$ information bits 1530, which is then divided into a second codeword of $\lceil (O_{HARQ-ACK}+O_{other\_UCI})/2 \rceil$ information bits 1540 and a third codeword of $\lfloor (O_{HARQ-ACK}+O_{other\_UCI})/2 \rfloor$ information bits 1550 (assuming $S_1 < O_{HARQ-ACK}+O_{other\_UCI} \leq S_2$ and by placing sequential bits of the first codeword into the second codeword and third codeword in an alternating fashion). Subsequently, the $\lceil (O_{HARQ-ACK}+O_{other\_UCI})/2 \rceil$ information bits 1540 are provided to a first RM code 1560 and the $\lfloor (O_{HARQ-ACK}+O_{other\_UCI})/2 \rfloor$ information bits 1550 are provided to a second RM code 1570. In the absence of other UL control information, the structure in FIG. 15 is identical to the structure in FIG. 14.

With the use of a dual RM code for HARQ-ACK transmission in a PUSCH, in order to ensure the same reliability for each of the two codewords, it is desirable to have an equal number from the Q' coded symbols, as they are computed for example using Equation (1), allocated to each of the two codewords of the RM code. This is particularly important if Q' is a small (positive) integer. Therefore, the computation of Q' should be modified if Q' is odd by adding one more coded symbol so that an even number of Q' coded symbol is obtained. For example, if $\lceil O_{HARQ-ACK} \cdot \beta_{offset}^{PUSCH}/(Q_m \cdot R) \rceil$ is odd, the computation in Equation (1) can be modified as set forth in Equation (4) below.

$$Q' = \min\left(\left\lceil \frac{O_{HARQ-ACK} \cdot \beta_{offset}^{PUSCH}}{Q_m \cdot R} \right\rceil + 1, 4 \cdot M_{sc}^{PUSCH} \right). \quad (4)$$

While the invention has been shown and described with reference to certain embodiments thereof, it will be understood by those skilled in the art that various changes in form and detail may be made therein without departing from the spirit and scope of the present invention as defined by the appended claims and their equivalents.

What is claimed is:

1. A method for a user equipment (UE) to encode acknowledgement information bits for transmission to a base station in a time division duplex (TDD) communication system, the method comprising the steps of:
   generating the acknowledgement information bits for each of a plurality of subframes and for each of a plurality of cells configured for the UE, wherein one acknowledgement information bit in one subframe is generated for each cell configured with a transmission mode (TM) that conveys one data transport block (TB), and wherein two acknowledgement information bits in one subframe are generated for each cell configured with a TM conveying two data TBs;
   generating a first codeword by arranging the acknowledgement information bits corresponding to the plurality of subframes for each of the plurality of cells in an order of ascending cell index values;
   encoding the first codeword, if a total number of acknowledgement information bits is less than or equal to a predetermined value; and
   placing acknowledgement information bits from the first codeword into a second codeword and a third codeword, in an alternating manner, and encoding the second codeword and the third codeword, if the total number of acknowledgement information bits is greater than the predetermined value.

2. The method of claim 1, wherein the transmission of the acknowledgement information bits is performed in a physical uplink shared channel and a number of the plurality of subframes is informed to the UE by an information element in at least one scheduling assignment transmitted by the base station in one of the plurality of configured cells.

3. The method of claim 1, wherein the transmission of the acknowledgement information bits is performed in a physical uplink control channel and in one of the plurality of configured cells.

4. The method of claim 1, wherein other uplink (UL) control information comprising a plurality of information bits are appended to the total number of acknowledgement information bits and, if a sum of the total number of acknowledgement information bits and the plurality of information bits is greater than the predetermined value, successive information bits from the sum are placed into a fourth codeword and into a fifth codeword, in an alternating fashion, in a physical uplink control channel, and the fourth codeword and the fifth codeword are encoded.

5. A method for a user equipment (UE) to transmit acknowledgement information bits to a base station in a time division duplex (TDD) communication system, the method comprising the steps of:
   generating the acknowledgement information bits for each of a plurality of subframes, and for each of a plurality of cells configured for the UE, wherein one acknowledgement information bit in one subframe is generated for each cell configured with a transmission mode (TM) that conveys one data transport block (TB), and wherein two acknowledgement information bits in one subframe are generated for each cell configured with a TM conveying two data TBs;
   configuring, by higher layer signaling, the UE to apply spatial-domain bundling for the acknowledgement information bits over the plurality of cells; and transmitting a total number of acknowledgement information bits in accordance with the spatial-domain bundling, a number of the plurality of subframes, a number of the plurality of cells, and a number of the plurality of cells.

6. The method of claim 5, wherein a subset of the cells is implicitly determined through the base station by configuring the UE with a number of the cells and by determining the number of the cells according to a descending order of cell index values.

7. The method of claim 5, wherein the UE applies the spatial-domain bundling if the transmission of the acknowledgement information bits is in a physical uplink shared channel, and wherein the UE does not apply spatial-domain bundling if the transmission of the acknowledgement information bits is in a physical uplink control channel.

8. A user equipment (UE) apparatus for transmitting acknowledgement information bits, the UE communicating with a base station in a time division duplex (TDD) system, the apparatus comprising:
a receiver configured to receive data transport blocks (TBs) over at least one of a plurality of configured cells and over at least one of a plurality of subframes;
an encoder configured to encode a first codeword if a total number of the acknowledgement information bits is less than or equal to a predetermined value, and to place successive acknowledgement information bits from the first codeword into a second codeword and a third codeword, in an alternating manner, and to encode the second codeword and the third codeword if the total number of the acknowledgement information bits is greater than the predetermined value; and
a transmitter configured to transmit the encoded acknowledgement information bits of the first codeword or the encoded acknowledgement information bits of second codeword and the third codeword;
a controller configured to generate the acknowledgement information bits for each of a subset of the plurality of subframes and for each of the plurality of configured cells, wherein one acknowledgement information bit in one subframe is generated for each cell configured with a transmission mode (TM) that conveys one data TB, and wherein two acknowledgement information bits in one subframe are generated for each cell configured with a TM that conveys two data TBs, to generate the first codeword by arranging the acknowledgement information bits corresponding to the subset of the plurality of subframes for each of the plurality of cells in an order of ascending cell index values, and to control operations of the receiver, the encoder, and the transmitter.

9. The UE of claim 8, wherein the transmission of the acknowledgement information bits is performed in a physical uplink shared channel and a number of the plurality of subframes is informed to the UE by an information element in at least one scheduling assignment transmitted by the base station in one of the plurality of configured cells.

10. The UE of claim 8, wherein the transmission of the acknowledgement information bits is performed in a physical uplink control channel and in one of the plurality of configured cells.

11. The UE of claim 8, wherein other uplink (UL) control information comprising a plurality of information bits are appended to the total number of acknowledgement information bits and, if a sum of the total number of acknowledgement information bits and the plurality of information bits is greater than the predetermined value, successive information bits from the sum are placed into a fourth codeword and a fifth codeword, in an alternating fashion, the fourth codeword and the fifth codeword are provided to the encoder, and the transmission is in a physical uplink control channel.

12. A user equipment (UE) for transmitting acknowledgement information bits, the UE communicating with a base station in a time division duplex (TDD) system, the apparatus comprising:
a receiver configured to receive data transport blocks (TBs) over at least one of a plurality of configured cells and over at least one of a plurality of subframes;
a transmitter configured to transmit a total number of acknowledgement information bits in accordance with spatial-domain bundling, a number of the plurality of subframes, and a number of the plurality of cells; and
a controller configured to generate the acknowledgement information bits for each of a subset of the plurality of subframes and for each of the plurality of configured cells, wherein one acknowledgement information bit in one subframe is generated for each cell configured with a transmission mode (TM) that conveys one data TB, and wherein two acknowledgement information bits in one subframe are generated for each cell configured with a TM that conveys two data TBs, and to apply the spatial-domain bundling for the acknowledgement information bits over the plurality of cells through higher layer signaling.

13. The UE of claim 12, wherein a subset of the cells is implicitly determined through the base station by configuring the UE with a number of the cells and the controller determines the number of the cells according to a descending order of cell index values.

14. The UE of claim 12, wherein the controller is configured to apply the spatial-domain bundling if the transmission of the acknowledgement information bits is in a physical uplink shared channel, and wherein the controller is configured not to apply spatial-domain bundling if the transmission of the acknowledgement information bits is in a physical uplink control channel.

* * * * *